(12) United States Patent
Michi et al.

(10) Patent No.: US 10,132,098 B1
(45) Date of Patent: Nov. 20, 2018

(54) NON-DISRUPTIVE REINFORCEMENT OF TELECOMMUNICATIONS TOWERS

(71) Applicant: ATC IP LLC, Boston, MA (US)

(72) Inventors: Diego Michi, San Miguel de Allende (MX); Heriberto Puga, Morelia (MX); Iván Rubio, Ciudad de México (MX); Jaime Gómez, Delegación Gustavo (MX); José Tlaxcala, Naucalpan (MX); Karina Cortés, Tecámac (MX); Marco Velázquez, Bosques la Salle (MX); Miguel Soto, Ciudad de México (MX); Saraí Bernal, Morelia (MX)

(73) Assignee: ATC IP LLC, Boston, MA (US)

( * ) Notice: Subject to any disclaimer, the term of this patent is extended or adjusted under 35 U.S.C. 154(b) by 0 days.

(21) Appl. No.: 15/596,741

(22) Filed: May 16, 2017

(51) Int. Cl.
*E04H 12/10* (2006.01)
*E04H 12/34* (2006.01)
*F16B 2/12* (2006.01)
*E04H 12/00* (2006.01)

(52) U.S. Cl.
CPC ............ *E04H 12/10* (2013.01); *E04H 12/34* (2013.01); *F16B 2/12* (2013.01); *E04H 2012/006* (2013.01)

(58) Field of Classification Search
CPC ... E04H 12/10; E04H 12/34; E04H 2012/006; E04H 12/2292; F16B 2/12
USPC .............. 52/651.01, 651.04, 651.02, 651.07, 52/651.09, 651.1
See application file for complete search history.

(56) References Cited

U.S. PATENT DOCUMENTS

| | | | | |
|---|---|---|---|---|
| 1,658,535 | A * | 2/1928 | Neilson, Sr. ............ | E21B 15/00 52/223.4 |
| 3,394,377 | A | 7/1968 | Alford | |
| 5,029,799 | A * | 7/1991 | Bernier .................. | F16M 11/06 248/514 |
| 5,954,305 | A * | 9/1999 | Calabro ............... | H01Q 1/1242 248/219.4 |
| 6,108,996 | A * | 8/2000 | McGinnis ........... | E04H 12/2292 52/152 |
| 6,151,860 | A * | 11/2000 | Reisdorff ................ | E04H 12/34 52/170 |

(Continued)

FOREIGN PATENT DOCUMENTS

| | | |
|---|---|---|
| AU | 2013900916 | 10/2014 |
| DE | 20200445 | 6/2002 |
| FR | 2822299 | 9/2002 |

OTHER PUBLICATIONS

International Search Report and the Written Opinion from International Searching Authority (US) for International Application No. PCT/US2018/032060, dated Aug. 2, 2018, 18 pages.

*Primary Examiner* — Brent W Herring
(74) *Attorney, Agent, or Firm* — BainwoodHuang

(57) ABSTRACT

A technique for reinforcing a telecommunication tower includes attaching a temporary structure to a vertical portion of the tower, transferring antenna equipment from the vertical portion of the tower to the temporary structure, and reinforcing the vertical portion of the tower while the transferred antenna equipment continues to operate. Once the vertical portion of the tower has been reinforced, the antenna equipment is transferred from the temporary structure back to the vertical portion of the tower. The temporary structure may then be moved to any other vertical portion of the tower, where the above acts may be repeated.

15 Claims, 10 Drawing Sheets

(56) References Cited

U.S. PATENT DOCUMENTS

| | | | |
|---|---|---|---|
| 6,694,698 B2* | 2/2004 | Ryan | E04C 3/30 |
| | | | 52/741.1 |
| 6,901,717 B2 | 6/2005 | Brunozzi et al. | |
| 6,915,618 B2 | 7/2005 | Payne | |
| 6,935,025 B1* | 8/2005 | Watson, III | E04H 12/10 |
| | | | 29/897.3 |
| 6,944,950 B1* | 9/2005 | Watson, III | E04H 12/10 |
| | | | 29/897.3 |
| 7,253,786 B1 | 8/2007 | Logozzo | |
| 7,642,988 B1* | 1/2010 | Johnson | H01Q 1/246 |
| | | | 343/872 |
| 8,191,332 B1 | 6/2012 | Semaan et al. | |
| 8,250,817 B2 | 8/2012 | Reyes et al. | |
| 8,641,002 B2* | 2/2014 | Hand | F03D 13/10 |
| | | | 248/230.1 |
| 8,655,409 B2* | 2/2014 | Linehan | H01Q 3/04 |
| | | | 343/766 |
| 9,118,106 B2* | 8/2015 | Adams | H01Q 1/125 |
| 9,376,830 B1* | 6/2016 | Watson, III | E04H 12/10 |
| 2004/0020158 A1 | 2/2004 | Kopshever | |
| 2004/0032375 A1 | 2/2004 | Ianello et al. | |
| 2007/0256388 A1* | 11/2007 | Ianello | E04H 12/2292 |
| | | | 52/651.07 |
| 2016/0060886 A1* | 3/2016 | Cook | E04G 23/0225 |
| | | | 52/514 |
| 2017/0226986 A1* | 8/2017 | Donnelly | F03D 7/0204 |

* cited by examiner

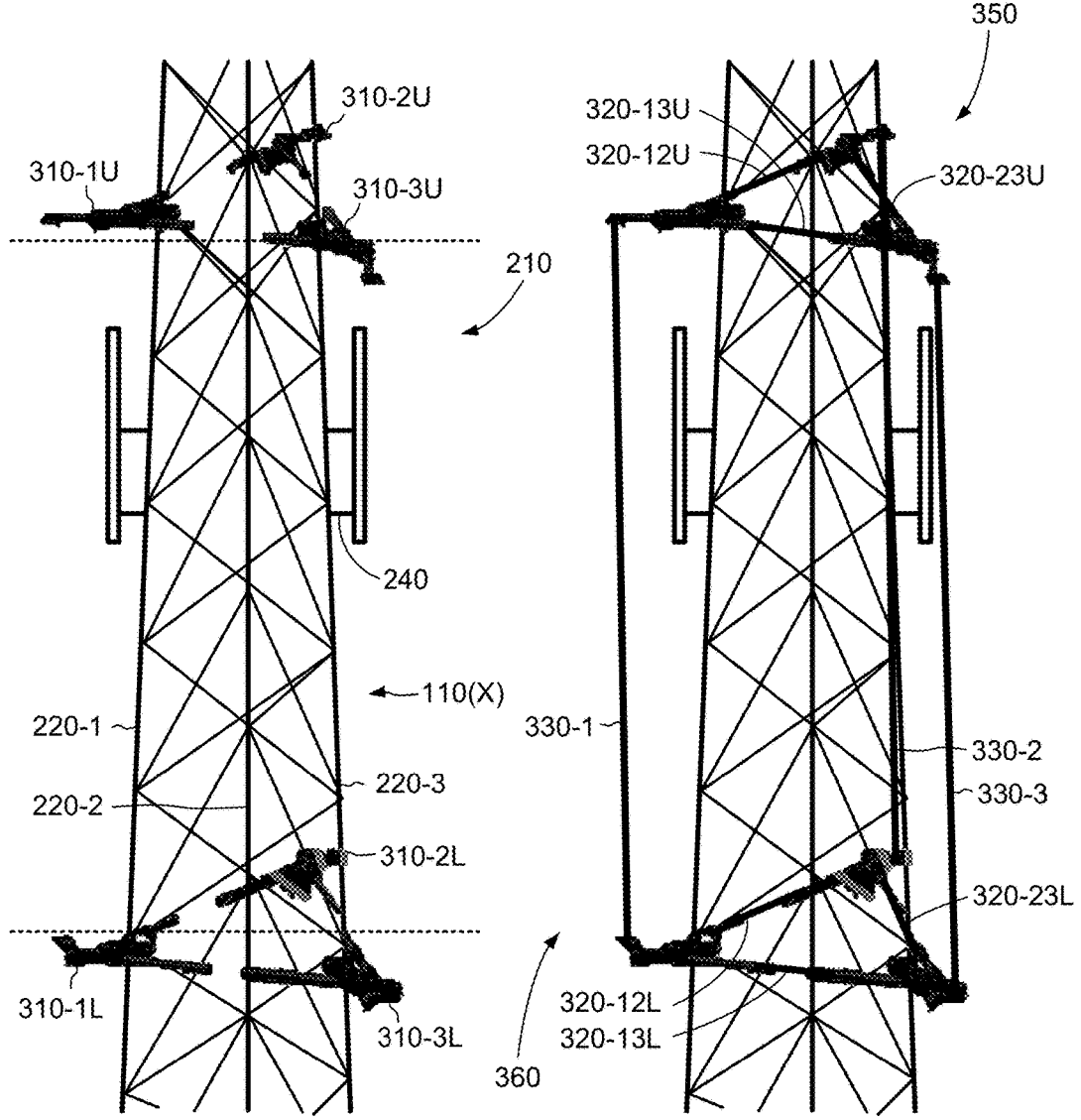
FIG. 3A  FIG. 3B

NON-DISRUPTIVE REINFORCEMENT OF TELECOMMUNICATIONS TOWERS

BACKGROUND

Telecommunications towers are a ubiquitous part of the modern landscape. As is known, telecommunications towers carry radio frequency (RF) and microwave antennas at elevated altitudes to support cellular telephone and other high-speed wireless communications. Tower designers typically limit the maximum weight of equipment that a tower can hold and the maximum wind load to which a tower can be subjected, such that the tower operates with adequate safety margin.

As demands increase for new equipment, e.g., to support new carriers and/or new technologies, tower operators can build new towers and/or install additional equipment on existing towers. As building new towers often entails the purchase or lease of new real estate, which can be expensive, operators often prefer to load their existing towers more heavily. To avoid exceeding design limits on weight, wind load, etc., operators may reinforce the structure of their existing towers, so that they are capable of safely withstanding the increased load.

Tower reinforcement generally entails removing existing antennas from a tower and applying reinforcements, e.g., by adding steel members to the tower and/or by replacing existing members with alternatives composed of stronger materials. Once the tower has been reinforced, the antennas are put back on the tower. New antennas or other equipment may be added.

SUMMARY

Unfortunately, prior approaches for reinforcing telecommunications towers are disruptive to users of tower equipment. For example, removing antennas from a tower to perform a tower upgrade takes the antennas out of service for an extended period of time. During such time, cellular telephone or data users can see a temporary loss of service or poor signal strength, as their wireless signals are caused to follow less optimal paths.

To minimize disruption, upgrade crews tend to work when cellular demand is lowest, such as between the hours of 1 AM and 5 AM. This arrangement subjects upgrade personnel to significant stress, however, as they are trying to work fast in the middle of the night, under artificial lighting, and with significant negative consequences if upgrades run late.

An upgrade crew can sometimes break up the job by working on one section of a tower at a time. For example, the crew might come back on different nights to work on different tower sections. Each night, they remove the antennas from one tower section, reinforce that tower section, and replace the antennas when finished. Although breaking up the job enables the tower reinforcement to be completed incrementally, it still does not address the loss or degradation in service to users. Nor does breaking up the job address the requirement to perform the upgrade under time pressure and in the dark. In fact, breaking up the tower reinforcement can introduce new difficulties because multiple upgrade sessions can be burdensome to schedule.

In contrast with prior approaches, which can result in disruption of service to users and can create difficulties for upgrade crews, an improved technique for reinforcing a telecommunication tower includes attaching a temporary structure to a vertical portion of the tower, transferring antenna equipment from the vertical portion of the tower to the temporary structure, and reinforcing the vertical portion of the tower while the transferred antenna equipment continues to operate. Once the vertical portion of the tower has been reinforced, the antenna equipment is transferred from the temporary structure back to the vertical portion of the tower. The temporary structure may then be moved to any other vertical portion of the tower, where the above acts may be repeated.

Advantageously, the improved technique operates with little or no disruption in service. For example, the antenna equipment can remain powered and operational for most if not all of the time during which the upgrade is performed.

As tower upgrades involve little or no disruption in service, upgrades can be performed at any time, night or day, even during hours of peak load. Thus, the requirement that upgrades be performed only at night is completely avoided. Time pressure on the upgrade crew is also reduced, as the crew's work can be done at any hour. In some examples, the crew can simply walk away from a site if available time runs out, even if work is not completed, and pick up later where they left off. If multiple upgrade session are needed, the sessions are much easier to schedule than they are with the prior approach.

Certain embodiments are directed to a method of non-disruptively reinforcing a telecommunications tower. The method includes attaching a temporary structure to a first portion of the telecommunications tower. The first portion of the telecommunications tower has antenna equipment attached thereto. The method further includes transferring the set of antenna equipment from the first portion of the telecommunications tower to the temporary structure and, while the antenna equipment operates, reinforcing the first portion of the telecommunications tower. The method still further includes transferring the set of antenna equipment from the temporary structure back to the first portion of the telecommunications tower and repeating the above acts for reinforcing at least a second portion of the telecommunications tower. The second portion of the telecommunications tower is vertically offset from the first portion of the telecommunications tower.

In some examples, the temporary structure includes a set of corner clamp assemblies (CCAs). Each CCA includes an upper corner clamp configured to removably attach to a vertical member of the tower at a first height of the tower, a lower corner clamp configured to removably attach to the vertical member of the tower at a second height of the tower, and a vertical stringer coupled between the upper corner clamp and the lower corner clamp. The vertical stringer is constructed and arranged to temporarily hold antenna equipment from the tower.

Other embodiments are directed to an apparatus for non-disruptively reinforcing a telecommunications tower. The apparatus includes a set of corner clamp assemblies (CCAs). Each CCA includes an upper corner clamp configured to removably attach to a vertical member of the tower at a first height of the tower, a lower corner clamp configured to removably attach to the vertical member of the tower at a second height of the tower, and a vertical stringer coupled to the upper corner clamp and to the lower corner clamp. The vertical stringer is constructed and arranged to hold antenna equipment from the tower in an operative state while a portion of the tower between the first height and the second height is reinforced.

Still other embodiments are directed to an apparatus for non-disruptively reinforcing a telecommunications tower. The apparatus includes at least three corner clamp assemblies (CCAs). Each CCA includes an upper corner clamp configured to removably attach to a vertical member of the tower at a first height of the tower, a lower corner clamp configured to removably attach to the vertical member of the tower at a second height of the tower, and a vertical stringer coupled to the upper corner clamp and to the lower corner clamp. The vertical stringer is constructed and arranged to hold antenna equipment from the tower in an operative state while a portion of the tower between the first height and the second height is reinforced. Each upper corner clamp is coupled, via a pair of upper connecting members, to respective upper corner clamps of a pair of adjacent CCAs, thereby forming an upper polygon having vertices formed by the upper corner clamps. Also, each lower corner clamp is coupled, via a pair of lower connecting members, to respective lower corner clamps of the pair of adjacent CCAs, thereby forming a lower polygon having vertices formed by the lower corner clamps.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIGS. 3A and 3B are perspective views that show an example sequence for attaching a temporary structure to the portion of the telecommunications tower shown in FIG. 2.

DETAILED DESCRIPTION OF THE INVENTION

Embodiments of the invention will now be described. Such embodiments are provided by way of example to illustrate certain features and principles of the invention but that the invention hereof is not limited to the particular embodiments described.

An improved technique for reinforcing a telecommunication tower includes attaching a temporary structure to a vertical portion of the tower, transferring antenna equipment from the vertical portion of the tower to the temporary structure, and reinforcing the vertical portion of the tower while the transferred antenna equipment continues to operate. Once the vertical portion of the tower has been reinforced, the antenna equipment is transferred from the temporary structure back to the vertical portion of the tower. The temporary structure may then be moved to any other vertical portion of the tower, where the above acts may be repeated.

Figure 1:
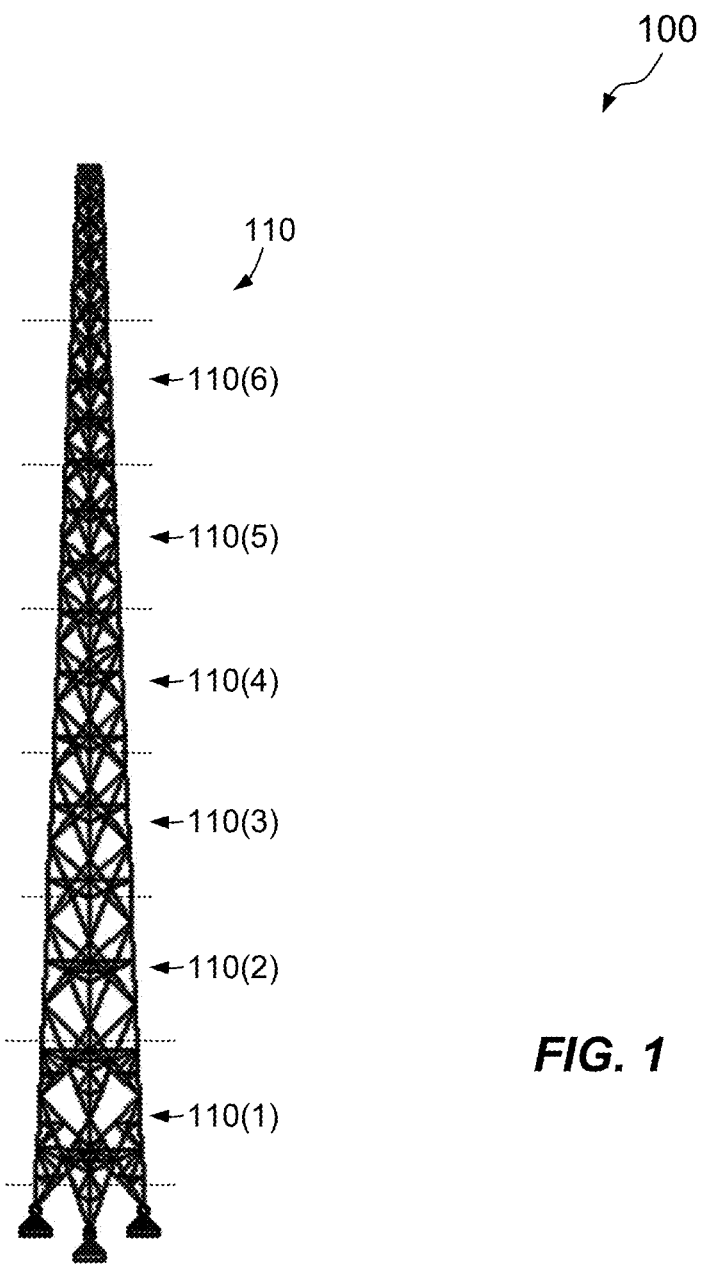
FIG. 1 is a perspective view of an example telecommunications tower with which embodiments of the invention can be practiced.

FIG. 1 shows an example environment 100 in which the improved technique can be practiced. Here, a tower 110 is seen to include multiple vertical portions 110(1) through 110(6), with each portion providing a site to which antenna equipment may be connected. In an example, each vertical portion supports equipment for a respective carrier and/or technology and has a height of six meters. The vertical portions 110(1) through 110(6) are not necessarily physically distinct regions, however, as tower operators may place equipment wherever they please along the height of the tower. Also, there may be any number of vertical portions and they may each have any desired height. Although the tower 110 as shown in FIG. 1 is a self-supporting tower, the invention hereof may be used with other types of towers, such as guyed towers.

Figure 2:
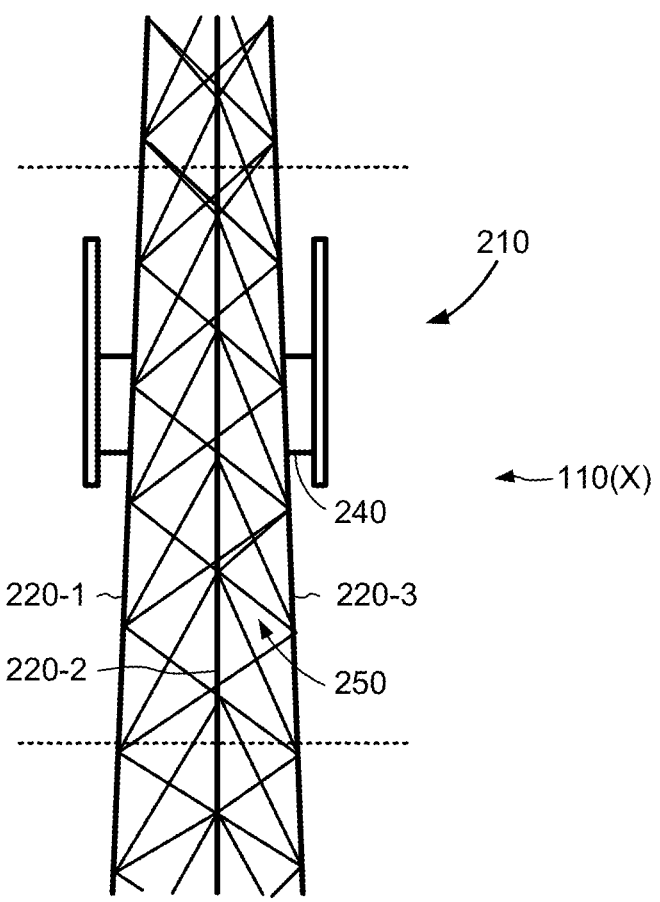
FIG. 2 is a perspective view of a portion of the telecommunications tower of FIG. 1 with antenna equipment attached thereto.

FIG. 2 shows a closer view of one vertical portion 110(X), which may be any of the vertical portions 110(1) through 110(6) of the tower 110. Here, the vertical portion 110(X) has antenna equipment 210 attached thereto. The tower 110 has vertical members 220-1, 220-2, and 220-3, which may be provided, for example, as tubes, rods, poles, or the like, and which are typically composed of steel or some other strong material. The three vertical members 220-1, 220-2, and 220-3 are typically equidistant from one another over the entire height of the tower 110, such that a cross-section of the tower 110 at any level forms an equilateral triangle, with vertical members 220-1, 220-2, and 220-3 forming the vertices. Other tower arrangements are possible, such as square towers, rectangular towers, and other towers having other polygon-shaped cross sections.

The antenna equipment 210 attaches to the vertical members 220-1, 220-2, and 220-3 via connecting arms 240, such as boom arm clamps, which clamp around the circumferences of the vertical members 220-1, 220-2, and 220-3. The tower 110 also includes a lattice 250, in which rigid members are arranged in a truss to provide the tower 110 with a high strength-to-weight ratio.

At some point in the lifetime of the tower 110, a tower owner or operator may wish to add more antenna equipment to the tower, such as to support a new carrier or new technology. If the added equipment would cause the tower 110 to exceed safe limits for weight, wind load, or other specifications, it will be necessary to reinforce the tower before adding the new equipment. In accordance with improvements hereof, such tower reinforcement proceeds non-disruptively with the aid of a temporary structure, which is referred to herein as a "Steel Climber™."

FIGS. 3A and 3B show an example sequence for attaching a steel climber 350 to the tower 110. As shown in FIG. 3A, a reinforcement crew attaches corner clamps 310 above and below the vertical portion 110(X) of the tower 110. Three upper corner clamps 310-1U, 310-2U, and 310-3U respectively attach to vertical members 220 (i.e., 220-1, 220-2, and 220-3), approximately one meter above the top of the vertical portion 110(X). Also, three lower corner clamps 310-1L, 310-2L, and 310-3L respectively attach to vertical members 220, approximately one meter below the bottom of the vertical portion 110(X). If the height of the vertical portion 110(X) is six meters, the upper and lower corner clamps may be spaced eight meters apart, for example. In this manner, the steel climber 350 will extend above and below the vertical portion 110(X), such that the entire vertical portion 110(X) can be easily serviced.

As shown in FIG. 3B, the crew attaches vertical stringers 330 between upper corner clamps and respective lower corner clamps. For example, stringer 330-1 connects upper corner clamp 310-1U to lower corner clamp 310-1L, stringer 330-2 connects upper corner clamp 310-2U to lower corner clamp 310-2L, and stringer 330-3 connects upper corner clamp 310-3U to lower corner clamp 310-3L. In this manner, the crew assembles three corner clamp assemblies (CCAs) 360, with each CCA including an upper corner clamp, a lower corner clamp, and a stringer. For example, the crew forms a first CCA from upper corner clamp 310-1U, lower corner clamp 310-1L, and stringer 330-1. Likewise, the crew forms a second CCA from upper corner clamp 310-2U, lower corner clamp 310-2L, and stringer 330-2, and forms a third CCA from upper corner clamp 310-3U, lower corner clamp 310-3L, and stringer 330-3. In an example arrangement, the vertical stringers 330 are spaced approximately 60 cm from the respective vertical members 220, allowing adequate space for workers to maneuver.

As further shown in FIG. 3B, connecting members 320 connect upper corner clamps 310 to their immediate neighbors. For example, upper connecting member 320-12U connects upper corner clamp 310-1U to upper corner clamp 310-2U. Likewise, upper connecting member 320-23U connects upper corner clamp 310-2U to upper corner clamp 310-3U, and upper connecting member 320-13U connects upper corner clamp 310-1U to upper corner clamp 310-3U. A similar arrangement is shown at the bottom, where connecting members 320 connects lower corner clamps 310 to their immediate neighbors. For instance, lower connecting member 320-12L connects lower corner clamp 310-1L to lower corner clamp 310-2L. Likewise, lower connecting member 320-23L connects lower corner clamp 310-2L to lower corner clamp 310-3U, and lower connecting member 320-13L connects lower corner clamp 310-1L to lower corner clamp 310-3L. With the arrangement as shown in FIG. 3B, the steel climber 350 is attached to the tower 110 and is ready to receive the antenna equipment 210.

Figures 4A, 4B:
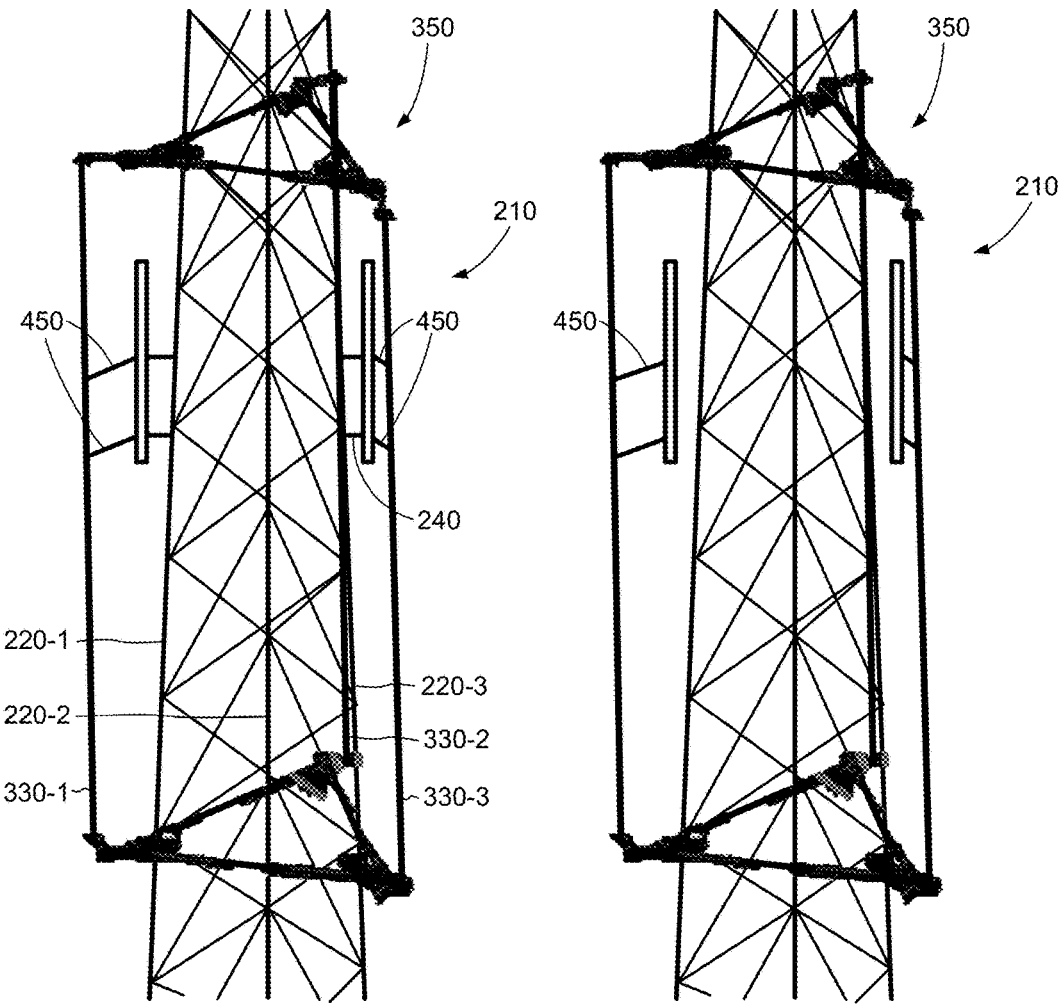
FIGS. 4A and 4B are perspective views that show an example sequence for transferring the antenna equipment from the telecommunications tower to the temporary structure.

FIGS. 4A and 4B show an example sequence for transferring antenna equipment 210 from the tower 110 to the steel climber 350. Preferably and whenever possible, the antenna equipment 210 remains stationary and operational throughout the entire transfer.

As shown in FIG. 4A, connecting arms 240 continue to attach antenna equipment 210 to vertical members 220, in the same manner as shown in FIG. 2. Here, however, parallel attachments 450 are formed, which independently support antenna equipment 210 from vertical stringers 330. Once attachments 450 to the stringers are securely established, antenna equipment 210 is disconnected from connecting arms 240, such that only the vertical stringers 330 support the antenna equipment 210. The crew may remove the connecting arms 24 removed entirely, clearing the vertical portion 110(X) and preparing it for reinforcement.

FIG. 4B shows the resulting arrangement. Here, the steel climber 350 carries the entire load of the antenna equipment 210, which preferably has not moved from its original placement and orientation. Any cabling connected to the antenna equipment 210 may remain connected throughout the transfer, thus ensuring no loss of service.

From here, the tower upgrade may proceed by reinforcing the vertical portion 110(X) in the usual way, such as by adding new steel members to the lattice 250. Once reinforcement of the portion 110(X) is complete, the crew may perform the above-described acts in reverse, e.g., by reattaching connecting arms 240 and removing attachments 450, thus transferring the antenna equipment 210 back to the vertical members 220. The crew may then remove the steel climber 350, e.g., by removing the stringers 330, the connecting members 320, and the corner clamps 310. The crew may then reattach the steel climber 350 to another vertical portion of the tower 110, repeating the above process for the other portion and for any additional portions needing reinforcement.

Figure 5:
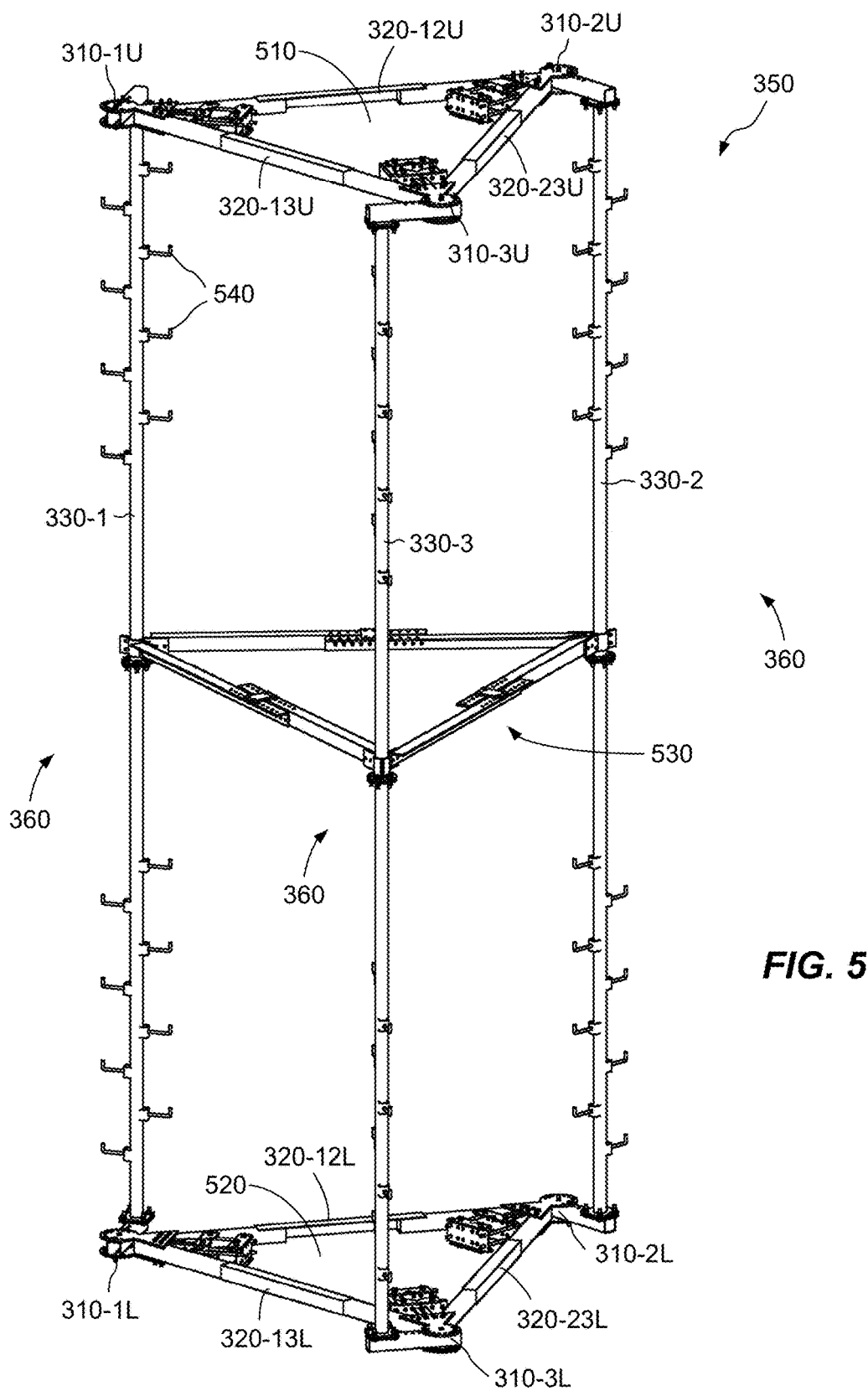
FIG. 5 is an elevated, isometric view of an example temporary structure in greater detail.

FIG. 5 shows a more detailed view of the steel climber 350. Here, upper connecting members 320-12U, 320-23U, and 320-13U form a triangle 510. In a similar manner, lower connecting members 320-12L, 320-23L, and 320-13L form a triangle 520. In some arrangements, a support 530 is positioned approximately mid-way along the height of the steel climber 350 to provide additional strength.

As further shown in FIG. 5, the vertical stringers 330 have ladder steps 540. Workers may use the ladder steps 540 to climb and descend the steel climber 350 and to gain a footing when connecting and disconnecting antenna equipment 210.

Figure 6:
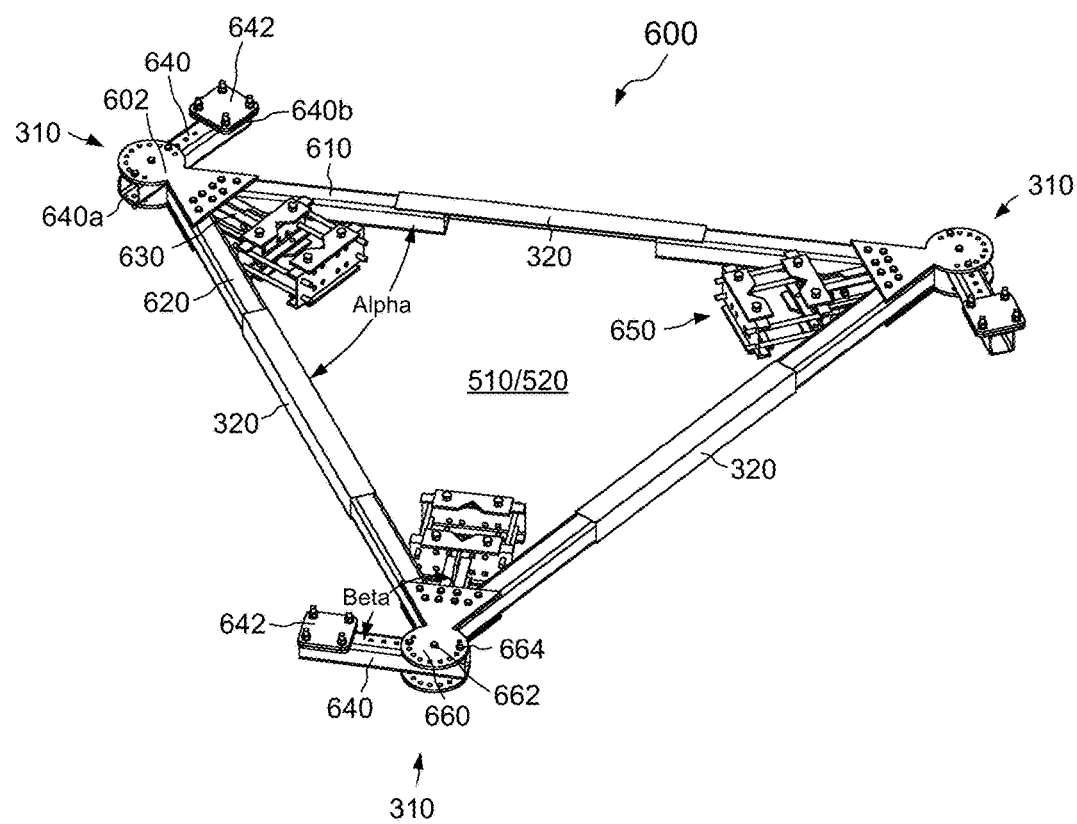
FIG. 6 is an elevated, isometric view of an example top and/or bottom of the example temporary structure of FIG. 5.

FIG. 6 shows an example bottom portion 600 of the steel climber 350 in additional detail. The figure is also illustrative of an example top portion of the steel climber 350, if turned upside down. Here, each corner clamp 310 is seen to include a support 602 and multiple arms extending horizontally therefrom. First and second arms 610 and 620 are configured to attach to adjacent corner clamps 310 via respective connecting members 320. The first and second arms 610 and 620 form an angle Alpha therebetween, which, in the illustrated arrangement, is sixty degrees.

A third arm 630 extends between the first arm 610 and the second arm 620, bisecting the angle Alpha. The third arm 630 has a proximal end coupled to the support 602, e.g., using bolts, and a distal end coupled to a set of jaws 650. The jaws 650 are configured to surround a vertical member 220 of the tower 110 and to grip it tightly. For example, jaws 650 may be fitted with nuts and bolts, which may be screwed together to tighten the jaws 650 around vertical members 220.

A fourth arm 640, also extending from the support 602, has a proximal end 640a coupled to the support 602 and a distal end 640b coupled to an adapter 642. Each adapter 642 is configured to connect to a vertical stringer 330. For example, each stringer 330 has a flange at its top and bottom, which screws to a respective adapter 642. A symmetrical arrangement may be provided to attach stringers 330 to adapters 642 at both the top of the steel climber 350 and at the bottom.

The fourth arm 640 can be seen to form an adjustable angle Beta with the support 602. For example, the proximal end 640a of the fourth arm 640 may attach to a rotary bracket 660. The rotary bracket 660 has a central hole and multiple additional holes around its circumference. By inserting a bolt 662 through the central hole only, the fourth arm 640 is free to swing to a desired angle Beta. Once the desired value of Beta is established, one or more additional bolts 664 may be inserted to lock the fourth arm 640 at the established angle. One should appreciate that the ability to adjust the angle Beta provides some flexibility in locating the steel climber 350 relative to the vertical members and can help to avoid interference with antenna equipment 210, cables, and the like.

In an example, the first and second arms 610 and 620 of each corner clamp 310 form telescoping connections with respective connecting members 320. For example, connecting arms 320 may have a square or L-shaped cross-sections, which the first and second arms 610 and 620 can enter or otherwise overlap to a desired extent, such that the overall triangular arrangement 600 can be made to fit closely to the tower 110. The arms 610 and 620 may fasten to the connecting members 320 using bolts (not shown) or other fasteners. The telescoping connections allow the steel climber 350 to accommodate towers of different cross-sectional size, as well as tapered towers, whose cross-sectional sizes change over their length.

The steel climber 350 provides an external structure that surrounds a portion 110(X) of the tower 110. The jaws 650 are disposed within the triangles 510 and 520, such that they grip the vertical members 220 from the outside. It is not required that the steel climber always be provided as an external structure, however. For example, the steel climber may alternatively be provided as an internal structure.

Figure 7:
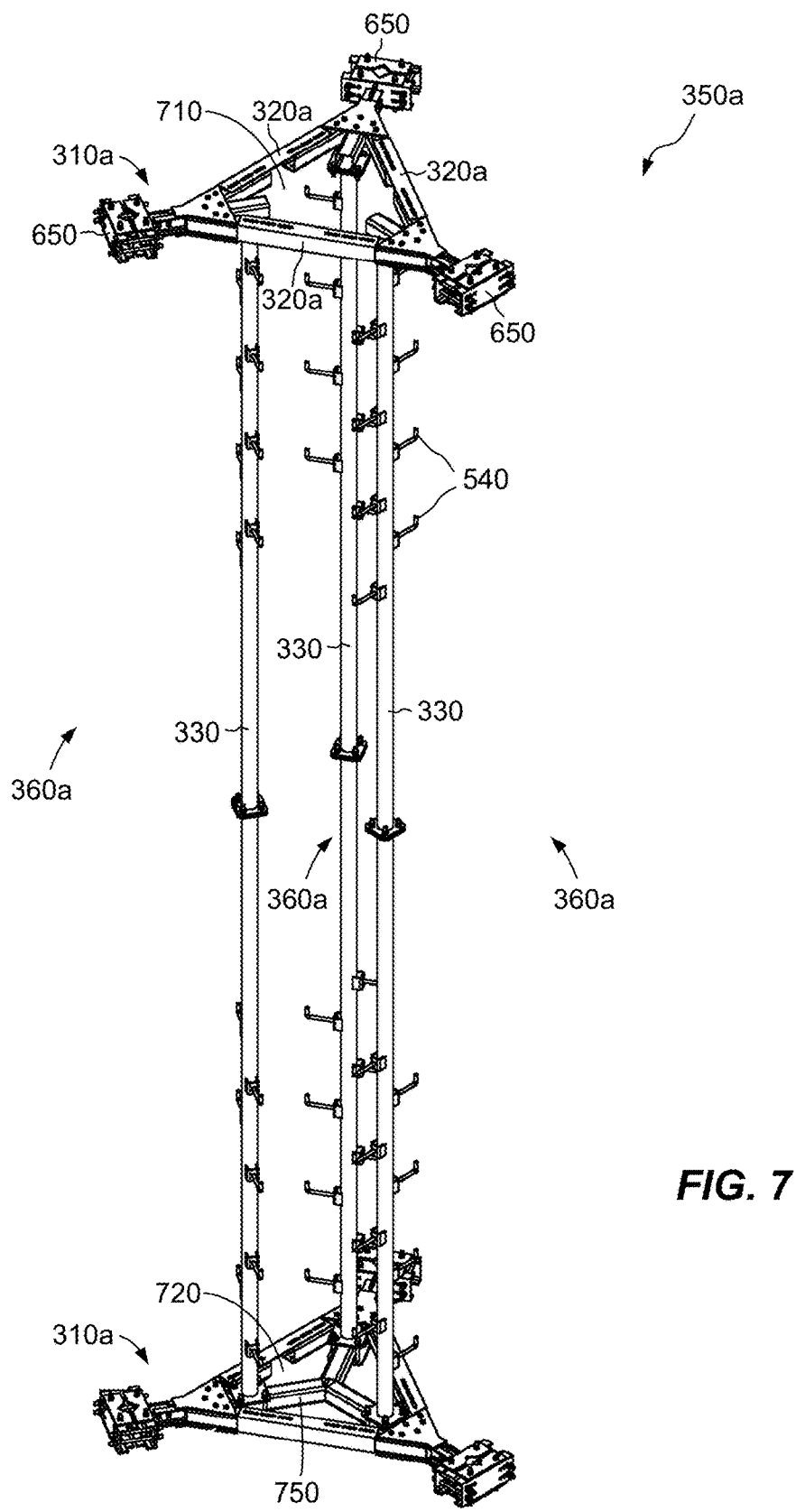
FIG. 7 is an elevated, isometric view of an alternative temporary structure.

FIG. 7 shows an example internal steel climber 350a. Here, telescoping connecting members 320a form upper and lower triangles 710 and 720 with corner clamps 310a. Jaws 650 are disposed outside the triangles 710 and 720, such that they attach to the vertical members 220 from the inside of the tower 110. An additional support 750 may be provided within one or both triangles 710 ad 720 for increased stability. Vertical stringers 330 as used with this internal arrangement may also employ ladder steps 540. Other accessories may be provided, as well, such as plan bracings, hip bracings, platforms, and so forth. As with the external steel climber 350, the internal steel climber 350a may also be regarded as including multiple corner clamp assemblies (CCAs) 360a, with each CCA 360a including a respective upper corner clamp 310a, lower corner clamp 310b, and vertical stringer 330.

Figure 8:
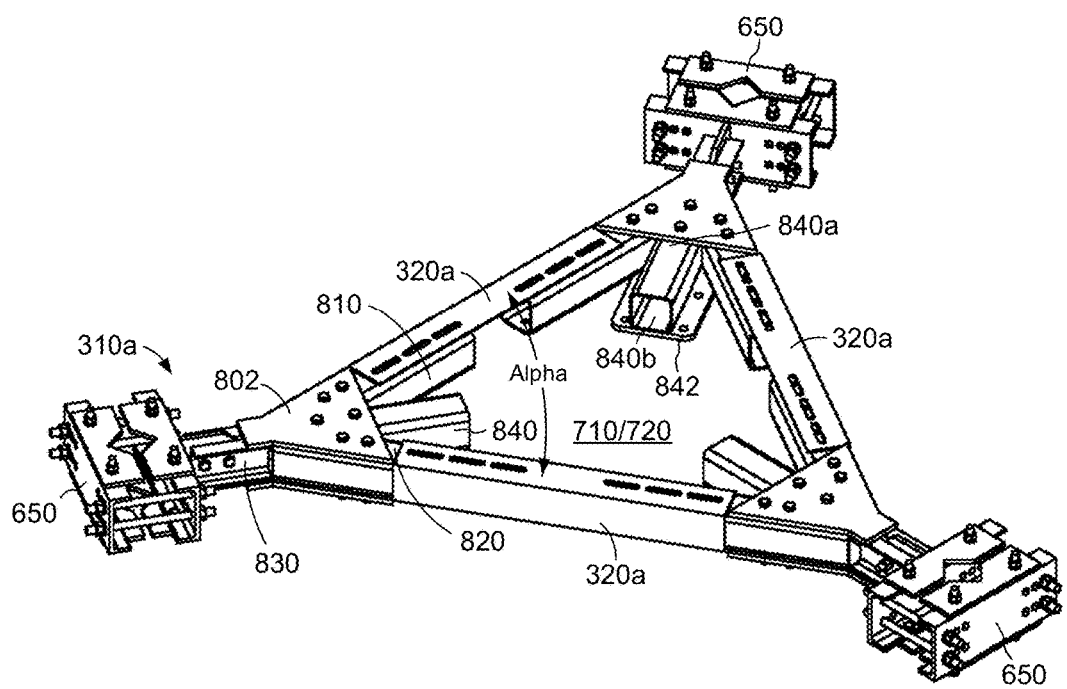
FIG. 8 is an elevated, isometric view of an example top and/or bottom of the alternative temporary structure of FIG. 7.

FIG. 8 shows a top portion of the steel climber 350a in additional detail. The figure is also illustrative of a bottom portion of the steel climber 350a, if turned upside down. Each corner clamp 310a is seen to include a support 802 with multiple arms extending horizontally therefrom. For example, first and second arms 810 and 820 extend outwardly at an angle Alpha and are configured to attach to other corner clamps 310 via telescoping connecting members 320a.

Figure 9:
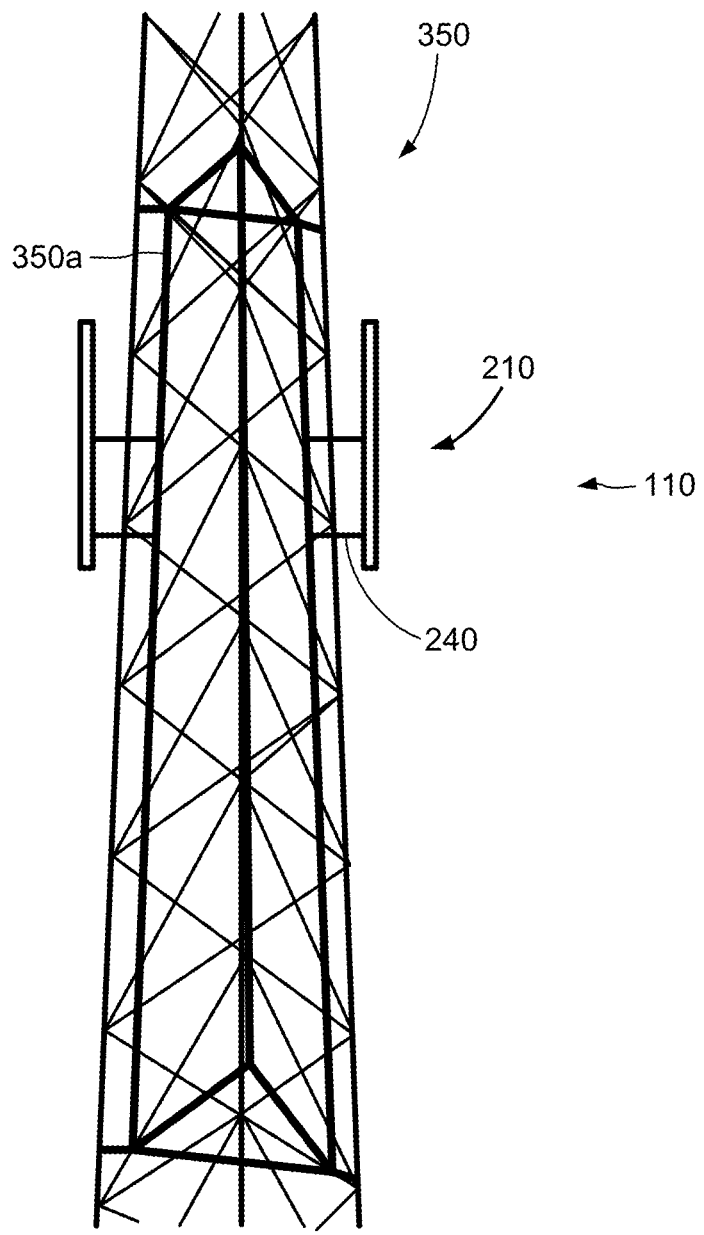
FIG. 9 is a perspective view showing an alternative temporary structure.

A third arm 830 extends away from the triangle 710 or 720 and has a distal end attached to jaws 650. A fourth arm 840 extends inwardly, bisecting the angle alpha. The fourth arm has a proximal end 840a coupled to the support 802 (e.g., bolted) and a distal end 840b coupled to an adapter 842. Each adapter 842 is configured to attach to a respective vertical stringer 330. An assembled and installed internal steel climber 350a can be seen in FIG. 9.

In an example, the steel climber 350 or 350a is constructed from standard, off-the-shelf components, such as standard sections of tubes, channels, plates, and angles, all with normal strength A36, and with standard bolts A325, threaded rods, washers, and nuts.

Figure 10:
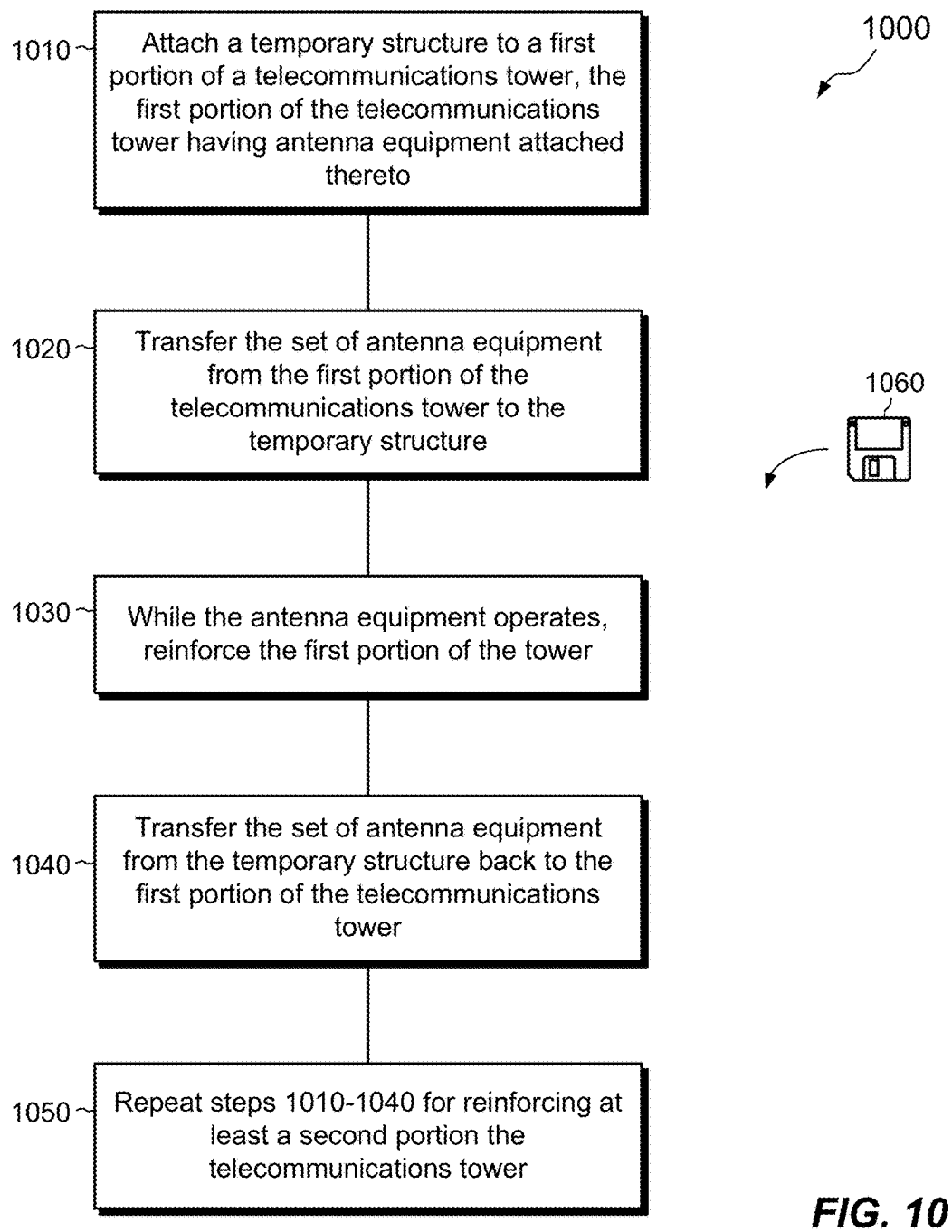
FIG. 10 is a flowchart showing an example method of non-disruptively reinforcing a telecommunications tower.

FIG. 10 shows an example method 1000 that may be carried out in connection with the environment 100. The method 1000 is typically performed, for example, by a crew of workers performing an upgrade to reinforce a tower 110. The various acts of method 1000 may be ordered in any suitable way. Accordingly, embodiments may be constructed in which acts are performed in orders different from that illustrated, which may include performing some acts simultaneously.

At 1010, a temporary structure 350 or 350a is attached to a first portion 110(X) of a telecommunications tower 110. The first portion 110(X) of the telecommunications tower has antenna equipment 210 attached thereto.

At 1020, the set of antenna equipment 210 is transferred from the first portion 110(X) of the telecommunications tower 110 to the temporary structure 350 or 350a.

At 1030, while the antenna equipment 210 operates, the first portion 110(X) of the tower 110 is reinforced.

At 1040, the set of antenna equipment 210 is transferred from the temporary structure 350 or 350a back to the first portion 110(X) of the telecommunications tower 110.

At 1050, steps 1010-1040 are repeated for reinforcing at least a second portion of the telecommunications tower 110. For example, a crew may partially disassemble the steel climber 350 or 350a relocate it at the second portion of the telecommunications tower. Relocating the steel climber may involve adjusting one or more of the telescoping connecting members 320 to accommodate the cross-sectional size of the tower 110 in the second portion. It may also involve adjusting the rotary bracket 660 of one or more corner clamps 310 (in the external arrangement) to adjust the angle Beta of the fourth arm 640, e.g., to avoid interference with cables or other hardware at the new location.

An improved technique has been described for reinforcing a telecommunication tower 110. The technique can be performed with little or no disruption in service, thus benefiting end users. Time pressure that normally accompanies tower upgrades is greatly reduced, as upgrades can be performed at any hour of the night or day, even during periods of peak usage. Upgrades are easier to perform and schedule, and they can be performed incrementally, without concern that the tower will be left in an inoperative state.

Having described certain embodiments, numerous alternative embodiments or variations can be made. For example, although embodiments have been shown and described for triangular towers, the same principles can be applied with square towers or to towers of other polygonal shape.

Also, although embodiments have been described in which a different corner clamp assembly (CCA) 360 or 360a is connected to each vertical member 220 of the tower 110, partial installations are also feasible. For instance, a steel climber 350 or 350a may be constructed with only a single CCA. In this arrangement, no connecting members 320 or 320a would be needed. Likewise, steel climbers may be constructed with only two CCAs or, more generally, with any number of CCAs less than or equal to the number of vertical members 220 in the tower 110.

Also, as shown and described, components of corner clamps 310 and 310a are connected using bolts or other fasteners. However, components that can remain together, such as the support 602 (or 802) and arms 610, 620, and 630 (or arms 810, 820. 830, and 840) may be connected together permanently, e.g., by welding, or they may be formed as an integrated unit, such as by casting.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. An apparatus for non-disruptively reinforcing a telecommunications tower, the apparatus comprising:
    a set of corner clamp assemblies (CCAs), each CCA including—
        an upper corner clamp configured to removably attach to a vertical member of the tower at a first height of the tower;
        a lower corner clamp configured to removably attach to the vertical member of the tower at a second height of the tower; and
        a vertical stringer coupled to the upper corner clamp and to the lower corner clamp, the vertical stringer constructed and arranged to hold antenna equipment from the tower in an operative state while a portion of the tower between the first height and the second height is reinforced,
    wherein each upper corner clamp includes:
        a support;
        a first arm that extends from the support in a first direction normal to the vertical stringer;
        a second arm that extends from the support in a second direction normal to the vertical stringer, the first arm and the second arm forming an angle therebetween,
        a third arm that extends from the support in a third direction, the third direction forming equal angles with the first arm and the second arm, the third arm having a proximal end coupled to the support and a distal end coupled to a set of jaws, the set of jaws configured to clamp to the respective vertical member of the tower; and
        a fourth arm that extends from the support in a fourth direction, the fourth arm having a proximal end coupled to the support and a distal end coupled to the respective vertical stringer,
        wherein an angle between the third arm and the fourth arm is adjustable.

2. The apparatus of claim 1, wherein each lower corner clamp is constructed as a mirror image of the respective upper corner clamp, such that each lower corner clamp includes a support and first through fourth arms.

3. The apparatus of claim 1, wherein the set of CCAs includes a first CCA and a second CCA, and wherein the apparatus further comprises:
    an upper connecting member attached between the upper corner clamp of the first CCA and the upper corner clamp of the second CCA; and
    a lower connecting member attached between the lower corner clamp of the first CCA and the lower corner clamp of the second CCA.

4. The apparatus of claim 3, wherein the upper connecting member forms a telescoping connection between the first arm of the upper corner clamp of the first CCA and the second arm of the upper corner clamp of the second CCA.

5. The apparatus of claim 4, wherein telescoping connection is adjustable for varying a separation between the first CCA and the second CCA.

6. The apparatus of claim 3, wherein the set of CCAs further includes a third CCA, and wherein the apparatus further comprises:
    a second upper connecting member attached between the upper corner clamp of the second CCA and the upper corner clamp of the third CCA; and
    a third upper connecting member attached between the upper corner clamp of the third CCA and the upper corner clamp of the first CCA;
    a second lower connecting member attached between the lower corner clamp of the second CCA and the lower corner clamp of the third CCA; and
    a third lower connecting member attached between the lower corner clamp of the third CCA and the lower corner clamp of the first CCA.

7. The apparatus of claim 6, wherein the upper connecting member, the second upper connecting member, and the third upper connecting member form a triangle, and wherein the set of jaws of each of the first, second, and third upper corner clamps are disposed inside the triangle.

8. The apparatus of claim 6, wherein the upper connecting member, the second upper connecting member, and the third upper connecting member form a triangle, and wherein the set of jaws of each of the first, second, and third upper corner clamps are disposed outside the triangle.

9. An apparatus for non-disruptively reinforcing a telecommunications tower, the apparatus comprising:
    at least three corner clamp assemblies (CCAs), each CCA including—
        an upper corner clamp configured to removably attach to a vertical member of the tower at a first height of the tower;
        a lower corner clamp configured to removably attach to the vertical member of the tower at a second height of the tower; and
        a vertical stringer coupled to the upper corner clamp and to the lower corner clamp, the vertical stringer constructed and arranged to hold antenna equipment from the tower in an operative state while a portion of the tower between the first height and the second height is reinforced,
    each upper corner clamp coupled, via a pair of upper connecting members, to respective upper corner clamps of a pair of adjacent CCAs, thereby forming an upper polygon having vertices formed by the upper corner clamps, and
    each lower corner clamp coupled, via a pair of lower connecting members, to respective lower corner clamps of the pair of adjacent CCAs, thereby forming a lower polygon having vertices formed by the lower corner clamps, wherein each upper corner clamp includes a support and an arm that extends from the support, the arm having a proximal end coupled to the support and a distal end coupled to the respective vertical stringer, the arm and the support forming an adjustable angle.

10. The apparatus of claim 9, wherein each upper corner clamp has jaws disposed inside the upper polygon and wherein each lower corner clamp has jaws disposed inside the lower polygon, such that the apparatus is disposed outside the tower when attached thereto.

11. The apparatus of claim 9, wherein each upper corner clamp has jaws disposed outside the upper polygon and wherein each lower corner clamp has jaws disposed outside the lower polygon, such that the apparatus is disposed inside the tower when attached thereto.

12. The apparatus of claim 11, wherein at least one of the vertical stringers has multiple ladder steps attached thereto.

13. The apparatus of claim 9, wherein each upper connecting member has a telescoping attachment with a respective upper corner clamp, such that separations between adjacent upper corner clamps are adjustable.

14. An apparatus for non-disruptively reinforcing a telecommunications tower, the apparatus comprising:
  a set of corner clamp assemblies (CCAs), each of the set of CCAs including—
    an upper corner clamp configured to removably attach to a vertical member of the tower at a first height of the tower;
    a lower corner clamp configured to removably attach to the vertical member of the tower at a second height of the tower; and
    a vertical stringer coupled to the upper corner clamp and to the lower corner clamp, the vertical stringer constructed and arranged to hold antenna equipment from the tower in an operative state while a portion of the tower between the first height and the second height is reinforced,
  wherein the tower has multiple vertical members, and wherein each of the set of CCAs is attached to a respective one of the vertical members by the upper corner clamp and the lower corner clamp of that CCA, and
  wherein the upper corner clamp includes an upper support and an upper arm that extends from the upper support at an adjustable angle, the upper arm having a proximal end coupled to the upper support and a distal end coupled to the vertical stringer.

15. The apparatus of claim 14, wherein the lower corner clamp includes a lower support and a lower arm that extends from the lower support at an adjustable angle, the lower arm having a proximal end coupled to the lower support and a distal end coupled to the vertical stringer.

* * * * *